US011462754B2

(12) United States Patent
Tanimoto et al.

(10) Patent No.: US 11,462,754 B2
(45) Date of Patent: Oct. 4, 2022

(54) FUEL CELL VEHICLE AND METHOD OF SETTING STOP TIME SCAVENGING PERIOD OF THE VEHICLE

(71) Applicant: HONDA MOTOR CO., LTD., Tokyo (JP)

(72) Inventors: Satoshi Tanimoto, Wako (JP); Joji Nakashima, Wako (JP); Go Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 17/014,142

(22) Filed: Sep. 8, 2020

(65) Prior Publication Data

US 2021/0075044 A1    Mar. 11, 2021

(30) Foreign Application Priority Data

Sep. 9, 2019  (JP) .............................. JP2019-163522

(51) Int. Cl.
| | |
|---|---|
| *H01M 8/04* | (2016.01) |
| *H01M 8/04746* | (2016.01) |
| *H01M 8/04119* | (2016.01) |
| *H01M 8/04223* | (2016.01) |

(52) U.S. Cl.
CPC ... *H01M 8/04753* (2013.01); *H01M 8/04126* (2013.01); *H01M 8/04253* (2013.01); *H01M 2250/20* (2013.01)

(58) Field of Classification Search
CPC ......... H01M 8/04126; H01M 8/04253; H01M 8/04753
USPC ....................................................... 429/413
See application file for complete search history.

(56) References Cited

U.S. PATENT DOCUMENTS

| 7,171,803 B2 | 2/2007 | Saito et al. |
| 7,666,535 B2 | 2/2010 | Ueda et al. |
| 2005/0214605 A1* | 9/2005 | Saitoh ............... H01M 8/04388 |
| | | 429/444 |

(Continued)

FOREIGN PATENT DOCUMENTS

| JP | 2002-313395 A | 10/2002 |
| JP | 2005-240730 A | 9/2005 |

(Continued)

OTHER PUBLICATIONS

Office Action dated Apr. 5, 2022 issued over the corresponding Japanese Patent Application No. 2019-163522 with the English translation thereof.

*Primary Examiner* — James M Erwin
(74) *Attorney, Agent, or Firm* — Carrier Blackman & Associates P.C.; Joseph P. Carrier; Jeffrey T. Gedeon (57) ABSTRACT

A fuel cell vehicle includes a fuel cell stack including a cathode flow field and an anode flow field, an atmospheric air pressure acquisition unit for obtaining pressure of atmospheric air, and a pump for sucking the atmospheric air and supplying an oxygen-containing gas to the cathode flow field through a supply channel. In the case where the temperature is predicted to be below freezing temperature after the time of stopping operation of the fuel cell stack, a scavenging period for the time of stopping operation is set based on the atmospheric air pressure, in order to perform scavenging of the cathode flow field by the oxygen-containing gas in a manner that the cathode flow field is placed in a predetermined humid state.

6 Claims, 6 Drawing Sheets

(56) References Cited

U.S. PATENT DOCUMENTS

| | | | | |
|---|---|---|---|---|
| 2012/0251910 A1* | 10/2012 | Matsumoto | ....... | H01M 8/04231 |
| | | | | 429/429 |
| 2014/0002027 A1 | 1/2014 | Guan | | |
| 2016/0133963 A1* | 5/2016 | Naganuma | ........ | H01M 8/04253 |
| | | | | 429/414 |
| 2019/0115604 A1* | 4/2019 | Takeyama | ......... | H01M 8/04089 |

FOREIGN PATENT DOCUMENTS

| | | |
|---|---|---|
| JP | 2007-053015 A | 3/2007 |
| JP | 2007-073335 A | 3/2007 |
| JP | 2008-288038 A | 11/2008 |
| JP | 2013-210344 A | 10/2013 |
| JP | 2014-011156 A | 1/2014 |

\* cited by examiner

FUEL CELL VEHICLE AND METHOD OF SETTING STOP TIME SCAVENGING PERIOD OF THE VEHICLE

CROSS-REFERENCE TO RELATED APPLICATION

This application is based upon and claims the benefit of priority from Japanese Patent Application No. 2019-163522 filed on Sep. 9, 2019, the contents of which are incorporated herein by reference.

BACKGROUND OF THE INVENTION

Field of the Invention

The present invention relates to a fuel cell vehicle including a fuel cell stack formed by stacking a plurality of power generation cells (unit cells) which perform power generation by electrochemical reactions of a fuel gas and an oxygen-containing gas. Further, the present invention relates to a method of setting a stop time scavenging period of the fuel cell vehicle.

Description of the Related Art

For example, a solid polymer electrolyte fuel cell includes a membrane electrode assembly (MEA) in which an anode is provided on one surface and a cathode is provided on the other surface of an electrolyte membrane, which is a polymer ion exchange membrane. The membrane electrode assembly is sandwiched between separators to form a power generation cell. Normally, a predetermined number of power generation cells are stacked together, to form a fuel cell stack. For example, the fuel cell stack is mounted as an in-vehicle fuel cell stack in a fuel cell vehicle (e.g., fuel cell electric automobile).

In the fuel cell vehicle, under low temperature environment, in order to prevent freezing of the water which is retained in a fuel cell system including the fuel cell stack, various scavenging methods of removing the retained water at the time of stopping the fuel cell vehicle, i.e., at the time of stopping the fuel cell system have been proposed.

For example, Japanese Laid-Open Patent Publication No. 2002-313395 (hereinafter referred to as JPA 2002-313395) proposes a technique where, in addition to scavenging of the fuel cell stack, scavenging of auxiliary devices such as a humidifier is performed for preventing decrease in the start-up performance due to freezing of water at the time of starting operation below freezing temperature, ([0035] and of JPA2002-313395).

SUMMARY OF THE INVENTION

Conventionally, the scavenging period is set in a manner that the alternating current impedance [mΩ] after scavenging of the fuel cell stack becomes certain impedance corresponding to the optimum humidified state, with reference to a substantially linear table in which, as the mass flow rate [g/sec] of the oxygen-containing gas (air) supplied to, for example, a cathode flow field in the fuel cell stack increases, the scavenging period becomes short.

However, even if the scavenging period is set based on the mass flow rate in this manner, the impedance immediately after start-up operation below freezing temperature after scavenging may vary, and thus the fuel cell stack may not be dried up to the suitable humid state, and the fuel cell stack may be dried excessively or insufficiently.

In particular, in areas where the altitude is high and the average air temperature is low (highlands), it is required to accurately perform scavenging control at the time of stopping the system in preparation for starting operation below freezing temperature.

The present invention has been made taking such problems into account, and an object of the present invention is to provide a fuel cell vehicle and a method of setting a scavenging period for the time of stopping operation of the vehicle fuel cell vehicle in which start-up performance is improved by reducing variation of impedance immediately after starting operation below freezing temperature.

A fuel cell vehicle according to an aspect of the present invention includes a fuel cell stack including a cathode flow field and an anode flow field, an atmospheric air pressure acquisition unit configured to obtain pressure of atmospheric air, a pump configured to suck the atmospheric air and supply an oxygen-containing gas to the cathode flow field through a supply channel, and a scavenging period setting unit configured to, in a case where temperature is predicted to be below freezing temperature after a time of stopping operation of the fuel cell stack, set a scavenging period for the time of stopping operation based on the atmospheric air pressure, in order to perform scavenging of the cathode flow field by the oxygen-containing gas in a manner that the cathode flow field is placed in a humid state which enables stable start-up operation below the freezing temperature.

According to another aspect of the present invention, a method of determining a stop time scavenging period of a fuel cell vehicle is provided. The fuel cell vehicle includes a fuel cell stack including a cathode flow field and an anode flow field, an atmospheric air pressure acquisition unit configured to obtain pressure of atmospheric air, and a pump configured to suck the atmospheric air and supply an oxygen-containing gas to the cathode flow field through a supply channel. The method includes the step of predicting whether or not temperature will be below freezing temperature after a time of stopping operation of the fuel cell stack, and the step of, in a case where the temperature is predicted to be below the freezing temperature, setting a scavenging period for the time of stopping operation in consideration of the atmospheric air pressure, in order to perform scavenging of the cathode flow field by the oxygen-containing gas in a manner that the cathode flow field is placed in a humid state which enables stable start-up operation below the freezing temperature.

In the present invention, since the scavenging period is set based on the atmospheric air pressure, regardless of whether the place is the highland where the air is thin or the plain land (normal land), it is possible to place a cathode flow field of a fuel cell stack in the optimum humid state.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Embodiments of a fuel cell vehicle according to the present invention and a method of setting a stop time scavenging period of the vehicle will be described with reference to the accompanying drawings.

[Structure]

Figure 1:
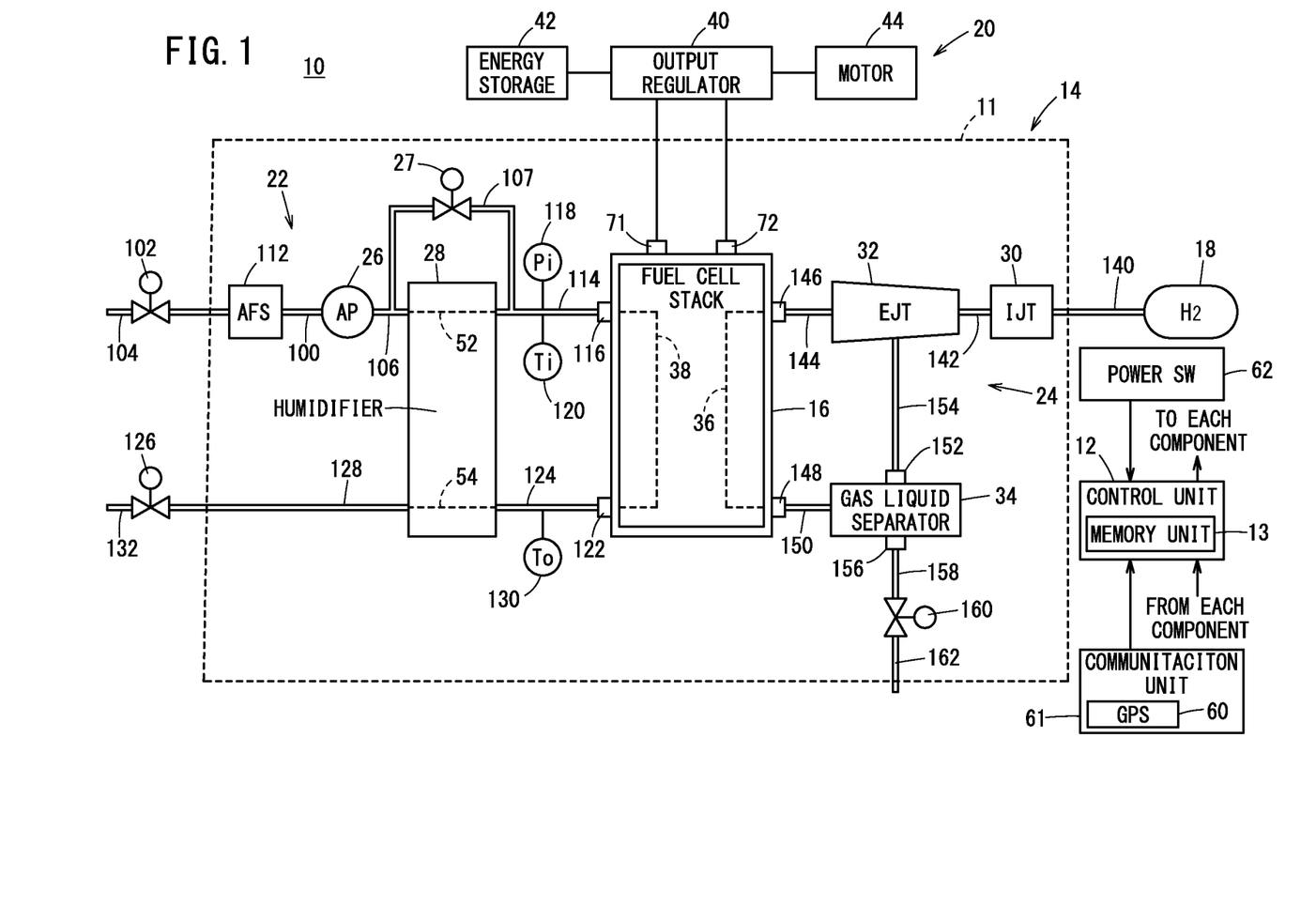
FIG. 1 is a schematic block diagram showing an example of structure of a fuel cell vehicle according to an embodiment for carrying out a method of setting a stop time scavenging period of a fuel cell vehicle according to an embodiment.

FIG. 1 is a schematic block diagram showing an example of structure of a fuel cell vehicle (own vehicle) 10 according to an embodiment for carrying out a method of setting stop time scavenging period of the fuel cell vehicle according to the embodiment.

The fuel cell vehicle 10 is made up of a control unit (scavenging period setting unit) 12 for controlling the entire fuel cell vehicle 10, a fuel cell system 14, and an output unit 20 electrically connected to the fuel cell system 14. The control unit 12 is made up of a microcomputer including a CPU and a memory unit 13.

The memory unit 13 connected to the CPU stores, in addition to a control program of the fuel cell vehicle 10, calculation equations, etc. for calculating scavenging period characteristics (scavenging period map) 80 (FIG. 3) described later and a volume flow rate F [m$^3$/sec].

In this embodiment, by executing the control program, the CPU of the control unit 12 functions as a scavenging period setting unit, a sub-freezing temperature prediction unit, etc.

The fuel cell system 14 is basically made up of a case unit 11 storing a fuel cell stack 16, and a hydrogen tank 18 connected to the case unit 11.

The case unit 11 stores an oxygen-containing gas system device 22 and a fuel gas system device 24 as auxiliary devices, in addition to the fuel cell stack 16.

The oxygen-containing gas system device 22 includes an air pump 26 and a humidifier 28. The fuel gas system device 24 includes an injector (IJT) 30, an ejector (EJT) 32, and a gas liquid separator 34.

For example, a solid polymer electrolyte membrane is interposed between a cathode and an anode each comprising catalyst to form a membrane electrode assembly (MEA), and the MEA is sandwiched between a pair of electrically conductive separators to form a unit cell (power generation cell, fuel cell). The fuel cell stack 16 has structure where a plurality of unit cells are stacked together in a thickness direction. Further, an anode flow field 36 as a passage of hydrogen (fuel gas) is formed on a surface of the separator facing the anode. A cathode flow field 38 as a passage of the air (oxygen-containing gas) is formed on a surface of the separator facing the cathode.

The fuel gas is supplied to the anode to produce hydrogen ions from hydrogen molecules in electrode reactions by the electrolyte, and the hydrogen ions move through the solid polymer electrolyte membrane toward the cathode. Electrons released from the hydrogen molecules flow from a negative electrode terminal 71 to the cathode through an output regulator 40, an energy storage 42 such as a battery and/or a capacitor, and external loads such as a motor 44, the air pump 26, the control unit 12, and moves to the cathode through a positive electrode terminal 72. At the cathode, by action of the catalyst, hydrogen ions and electrons, and oxygen contained in the supplied oxygen-containing gas are reacted to produce water.

As necessary, a measurement instrument for measuring alternating current impedance is connected between the positive electrode terminal 72 and the negative electrode terminal 71.

The air pump 26 is formed of a mechanical supercharger, etc. driven by a motor, and has a function to suck and pressurize the atmospheric air (air), and supplies the air to the humidifier 28.

The humidifier 28 includes a channel 52 as a passage of an oxygen-containing gas (dried air), and a channel 54 as a passage of an exhaust gas (humid oxygen-containing exhaust gas, cathode off gas) from the cathode flow field 38 of the fuel cell stack 16 flowing through an oxygen-containing gas outlet connection port 122 of the fuel cell stack 16 and a pipe channel 124. The humidifier 28 has a function of humidifying the oxygen-containing gas supplied from the air pump 26. That is, the humidifier 28 moves the water content contained in the exhaust gas to the supply gas (oxygen-containing gas) through a porous membrane.

The degree of humidification at this time is set to a humidification quantity at which the solid polymer electrolyte membrane is humidified to suitably exert the power generation performance in the fuel cell stack 16.

A bypass channel 107 as a pipe channel including a bypass valve 27 is provided between both ends of the channel 52 of the humidifier 28, the bypass channel 107 supplying the dry air from the air pump 26 to the fuel cell stack 16 by bypassing the humidifier 28.

The intake port side of the air pump 26 is connected to the atmospheric air through a pipe channel 100, an air flow sensor (AFS) (mass flow rate sensor) 112, a shut-off valve 102 (that can be omitted), and a pipe channel 104, and the discharge side of the air pump 26 is connected to one end of the channel 52 of the humidifier 28 through a pipe channel 106. The other end of the channel 52 is connected to one end of a supply channel 114 as a pipe channel, and the other end of the supply channel 114 is connected to the cathode flow field 38 in the fuel cell stack 16 through an oxygen-containing gas inlet connection port 116.

It should be noted that the air flow sensor 112 measures a mass flow rate M [g/min] of the oxygen-containing gas supplied to the cathode flow field 38 of the fuel cell stack 16, and outputs the data of the measured mass flow rate M [g/min] to the control unit 12.

The supply channel 114 is provided with a cathode inlet pressure sensor 118 for detecting the pressure of the oxygen-containing gas flowing through the supply channel 114 as a cathode inlet pressure Pi [kPa], and a cathode inlet temperature sensor 120 for detecting the temperature of the oxygen-containing gas flowing through the supply channel 114 as a cathode inlet temperature Ti [K].

A pipe channel 132 connected to a dilution device, etc. through a pipe channel 128, a shut-off valve 126 (that can be omitted) is provided at the discharge side of the channel 54 of the humidifier 28.

The pipe channel 124 connected to the oxygen-containing gas outlet connection port 122 is provided with a cathode outlet temperature sensor 130 for detecting the temperature of the oxygen-containing exhaust gas as a cathode outlet temperature To [K].

The hydrogen tank 18 is a container including a solenoid shut-off valve, and compresses highly pure hydrogen under high pressure, and stores the compressed hydrogen.

The fuel gas discharged from the hydrogen tank 18 flows through a pipe channel 140, the injector 30, a pipe channel 142, the ejector 32, and a pipe channel 144, and is then supplied to the inlet of the anode flow field 36 of the fuel cell stack 16 through a fuel gas inlet connection port 146.

The inlet of the gas liquid separator 34 is connected to the outlet of the anode flow field 36 through a fuel gas outlet connection port 148 and a pipe channel 150, and a fuel exhaust gas (anode off gas) as a hydrogen-containing gas is supplied to the gas liquid separator 34 from the anode flow field 36.

The gas liquid separator 34 separates the fuel exhaust gas into gas component and liquid component (liquid water). The gas component of the fuel exhaust gas is discharged from a gas discharge port 152 of the gas liquid separator 34 toward the ejector 32 through a pipe channel 154.

A fuel gas is supplied to the ejector 32 from the injector 30 provided on the upstream side of the ejector 32, through the pipe channel 142. Therefore, in the state where the gas component of the fuel exhaust gas is sucked by the ejector 32, and mixed with the fuel gas, the gas component flows through the pipe channel 144 of the fuel cell stack 16, and is supplied to the anode flow field 36 of the fuel cell stack 16 through the fuel gas inlet connection port 146.

The liquid component of the fuel exhaust gas flows from a liquid exhaust port 156 of the gas liquid separator 34, through a pipe channel 158, a water discharge valve 160, and a pipe channel 162, and is then discharged to the outside of the fuel cell vehicle 10 through a dilution device (not shown), etc.

The fuel cell vehicle 10 is provided with communication units (an atmospheric air humidity acquisition unit, an atmospheric air pressure acquisition unit) 61 including a GPS unit 60 for detecting three dimensional position information of the own vehicle position {latitude, longitude, height (altitude)}. The control unit 12 obtains the own vehicle position from the GPS unit 60 as necessary. The GPS unit 60 can use a satellite positioning device in addition to the GPS.

The control unit 12 calculates a pressure of the atmospheric air (atmospheric air pressure) Pa [kPa] at the altitude of the own vehicle position, from the altitude of the own vehicle position and (the value of) the 0 m atmospheric air pressure obtained from weather information through the communication unit 61, and obtains a humidity Ha [%] of the atmospheric air from the weather information. In this case, the control unit 12 functions as the atmospheric air pressure acquisition unit and the atmospheric air humidity acquisition unit.

Further, the fuel cell vehicle 10 is provided with a power switch (power SW) 62, which is an ON/OFF switch that is operated when operation of the fuel cell vehicle 10 is started to start power generation by the fuel cell stack 16 and that is also operated when the power generation is stopped to place the fuel cell vehicle 10 in the soak (key off) state.

[Operation]

Figure 2:
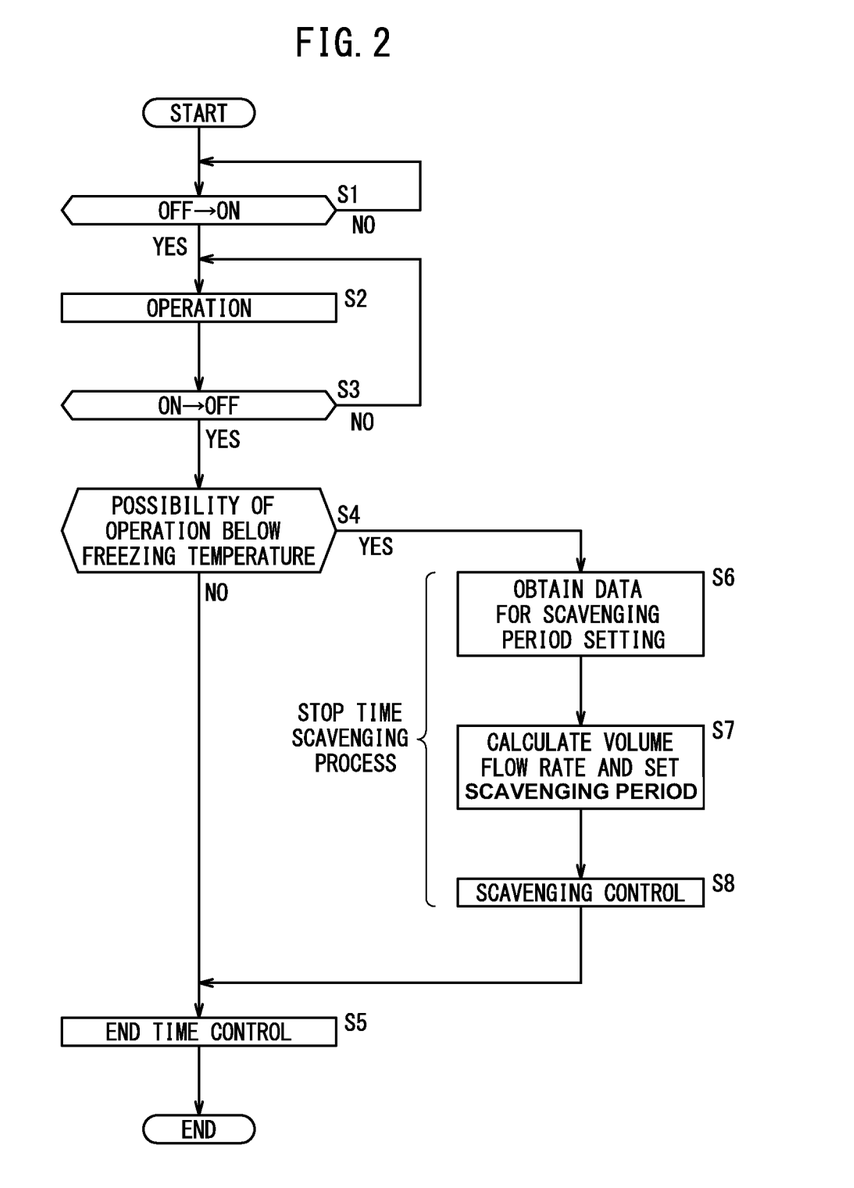
FIG. 2 is a flow chart showing operation of a fuel cell vehicle and a method of setting a stop time scavenging period of the vehicle shown in FIG. 1.

Next, operation of the fuel cell vehicle (vehicle) 10 basically having the above structure will be described in detail based on a flow chart shown in FIG. 2. Unless specifically noted, (the CPU of) the control unit 12 performs the process in a flow chart (control program). However, for the sake of convenience, reference to the control unit 12 will be made only when necessary.

In step S1, the control unit 12 detects whether the power switch 62 of the fuel cell vehicle 10 has been switched from the OFF state to the ON state.

If it is detected the power switch 62 has been switched to the ON state (step S1: YES), in step S2, travel of the fuel cell vehicle 10 and the power generation operation are executed.

In this case, the fuel gas is supplied from the hydrogen tank 18 into the anode flow field 36 in the fuel cell stack 16 through the pipe channel 140, the injector 30, the pipe channel 142, the ejector 32, the pipe channel 144, and the fuel gas inlet connection port 146.

At the same time, the oxygen-containing gas sucked by the air pump 26 flows through the pipe channel 104, the opened shut-off valve 102, the pipe channel 100, the air flow sensor 112, the air pump 26, the channel 52, the supply channel 114, and the oxygen-containing gas inlet connection port 116, and is then supplied to the cathode flow field 38 in the fuel cell stack 16. Therefore, the fuel gas and the oxygen-containing gas (both of reactant gases) are partially consumed in the electrochemical reactions (power generation reactions) by the anode catalyst of the anode and the cathode catalyst of the cathode to perform power generation. The motor 44 is driven through the output regulator 40 in accordance with an accelerator opening angle of an accelerator pedal (not shown) to enable travel of the fuel cell vehicle 10. The excessive power generation electrical energy and the regenerative electrical energy of the motor 44 are stored in the energy storage 42 through the output regulator 40.

The oxygen-containing gas, which has been supplied to the cathode and has been partially consumed at the cathode, flows through the pipe channel 124 as the oxygen-containing exhaust gas, and then flows through the channel 54 of the humidifier 28 to humidify the oxygen-containing gas supplied from the air pump 26 to the fuel cell stack 16 through the channel 52 of the humidifier 28. The oxygen-containing exhaust gas containing reaction produced water (water content) produced in the reactions in the fuel cell stack 16 flows through the channel 54 of the humidifier 28, the pipe channel 128, and the opened shut-off valve 126, and is then discharged to the outside through the pipe channel 132.

In the meanwhile, the remaining fuel gas, which has not been consumed at the anode, is discharged from the fuel gas outlet connection port 148 as the fuel exhaust gas of the fuel cell stack 16 into the pipe channel 150, and is introduced into the gas liquid separator 34. Thus, the fuel exhaust gas is separated into the exhaust gas as the gas component and the exhaust fluid as liquid component (liquid water). At this time, when the water discharge valve 160 is in the close state, the discharged fluid is retained on the upstream side of the water discharge valve 160.

In this case, the fuel gas is injected from the injector 30 toward the upstream side of the ejector 32. As a result, a negative pressure is produced in the pipe channel 154. Therefore, the exhaust gas is sucked into the ejector 32 through the pipe channel 154, and mixed with the fuel gas supplied to the pipe channel 142. As a result, the mixed gas is discharged into the pipe channel 144 on the downstream side of the ejector 32.

That is, the liquid water is removed from the remaining fuel gas, which has not been consumed in the power generation reactions and is discharged from the anode as the fuel exhaust gas, to produce the exhaust gas. Then, the exhaust gas is mixed with a fuel gas newly supplied to the pipe channel 142 to produce a mixed gas, and the mixed gas is supplied to the anode again.

It should be noted that, when a predetermined quantity or more of fluid is stored in the gas liquid separator 34 while the power generation is continued, the water discharge valve 160 is opened to achieve a predetermined fluid level.

During power generation operation in step S2 as described above, in step S3, the control unit 12 detects whether the power switch 62 of the fuel cell vehicle 10 has been switched from the ON state to the OFF state.

When it is detected that the power switch 62 has been switched from the ON state to the OFF state (step S3: YES), the stop time process in step S4 and the subsequent steps are performed.

In step S4, the control unit 12 obtains weather information from the communication unit 61, and determines whether or not there is possibility that the next start-up operation will be performed below the freezing temperature. In this case, the control unit 12 functions as the sub-freezing temperature prediction unit.

If the start-up operation will not be performed below the freezing temperature (step S4: NO), end time control is performed in step S5. That is, the air pump 26 is stopped to close the shut-off valve (not shown) of the hydrogen tank 18 and the shut-off valves 102, 126, and the water discharge valve 160 is opened. After finishing discharge of the water, the water discharge valve 160 is closed, and power supply from the energy storage 42 to the auxiliary devices (in this case, including an air conditioner, etc.) is stopped to stop the fuel cell system 14. As a result, the fuel cell vehicle 10 is placed in the soak state.

On the other hand, in the case where the result of the possibility determination (prediction determination) that the next start-up operation will be performed below the freezing temperature in step S4 is positive (step S4: YES), i.e., in the case where the possibility that the next start-up operation will be performed below the freezing temperature is high (including the case where the possibility that the temperature will be dropped below the freezing temperature before performing the next start-up operation), the stop time scavenging process in steps S6 to S8 is performed.

In this embodiment, the stop time scavenging process is performed for the oxygen-containing gas system device 22 and the cathode flow field 38 of the fuel cell stack 16, i.e., performed for the cathode system. By scavenging the cathode flow field 38, it is possible to remove the water content retained in the anode flow field 36 as well. Further, the scavenging process for the anode system may be performed in a manner that the oxygen-containing gas is also supplied into the anode flow field 36.

In step S6, data for setting the scavenging period St [sec] is obtained. In this case, the memory unit 13 stores the scavenging period characteristics (scavenging period map) 80 shown in FIG. 3 beforehand.

Figure 3:
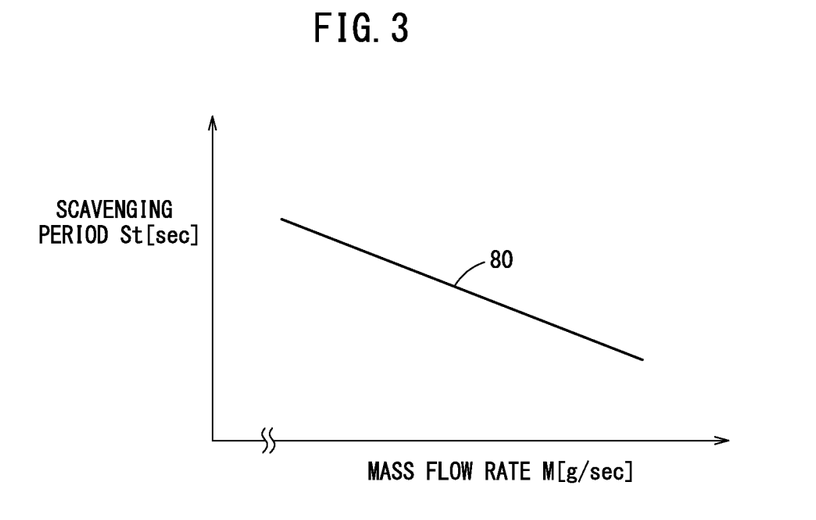
FIG. 3 is a graph showing characteristics of the scavenging period relative to the mass flow rate.

As shown in FIG. 3, the scavenging period characteristics 80 are represented by a substantially linear characteristic curve where, as the mass flow rate M [g/sec] of the air supplied from the air pump 26 to the cathode flow field 38 of the fuel cell stack 16 increases, the scavenging period becomes short.

It should be noted that, preferably, the control of the electrochemical reaction of the fuel cell stack 16 is performed based on the mass flow rate M. However, preferably, the control of scavenging is not performed based on the mass flow rate M, but performed based on the volume flow rate F in consideration of the change in the atmospheric air so as to place the inside of the fuel cell stack 16 in the suitable humidified state.

The scavenging period St [sec.] based on the volume flow rate F [m$^3$/sec] has characteristics where the scavenging period St [sec.] is equivalent to a value obtained by dividing the mass flow rate M of the horizontal axis of the scavenging period characteristics 80 in FIG. 3 by the density [g/m$^3$] of the air. Therefore, hereinafter, for ease of understanding, the description will be given assuming that the characteristics 80 shown in FIG. 3 are regarded as the characteristics of the scavenging period St relative to the volume flow rate F [m$^3$/sec].

Figure 4:
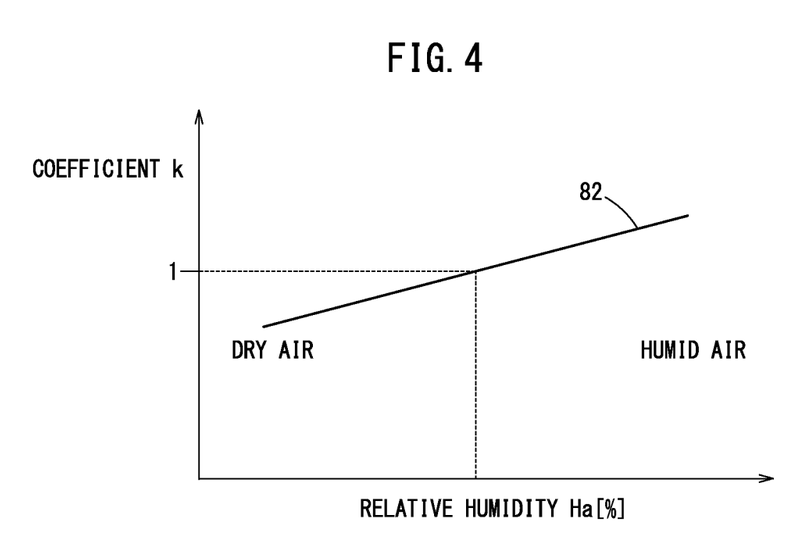
FIG. 4 is a graph showing characteristics of the correction coefficient of the scavenging period relative to the air intake humidity.

Then, in step S7, as described later, the volume flow rate F, at which more suitable scavenging can be performed than at the mass flow rate M and the inside of the fuel cell stack 16 can be placed in the suitably humid state, is calculated. The scavenging period St is set based on the calculated volume flow rate F with reference to the scavenging period characteristics 80. Further, the set scavenging period St is corrected by being multiplied by a coefficient k (the value of the coefficient k relative to the standard air intake humidity (relative humidity) Ha [%] is 1) to set the scavenging period St×k. The coefficient k is represented by characteristics 82 shown in FIG. 4, which increase in proportion to the air intake humidity (relative humidity) Ha [%]. The control unit 12 functions as the scavenging period setting unit.

Then, in step S8, the control unit 12 activates a timer counter (time counting unit/number counting unit) of the control unit 12, and performs the scavenging process (cathode scavenging process) for a period corresponding to the scavenging period St×k. During the scavenging process, the bypass valve 27 is released (fully opened). Therefore, the fuel cell stack 16 is dried up to a suitable humidified state, and the alternating current impedance [mΩ] at the end of the scavenging falls within a predetermined range. As a result, variation of the alternating current impedance immediately after starting the next operation is suppressed, and improvement in the start-up performance is achieved.

The end time control is performed in step S5 after step S8. In this case, the air pump 26 is stopped to close the shut-off valve (not shown) of the hydrogen tank 18 and the shut-off valves 102, 126, and the water discharge valve 160 is opened. After finishing discharge of the water, the water discharge valve 160 is closed, and power supply from the energy storage 42 to the auxiliary devices (in this case, including the air conditioner, etc.) is stopped to stop the fuel cell system 14. As a result, the fuel cell vehicle 10 is placed in the soak state.

In the step S7 described above, the control unit 12 calculates the volume flow rate F [m$^3$/sec] using the following equations (1) and (2).

$$F\ [\text{m}^3/\text{sec}] = \{M\ [\text{g/min}] \times 22.4\ [\text{m}^3]/(28.84\ [\text{g}] \times 60\ [\text{sec}])\} \times (101.32\ [\text{kPa}]/Piabs\ [\text{kPa}]) \times \{(273.15\ [\text{K}] + Ti\ [\text{K}])/273.15\ [\text{K}]\} \quad (1)$$

$$Piabs = Pa + Pi \quad (2)$$

It should be noted that F is the volume flow rate [m$^3$/sec]. M is the mass flow rate [g/min] which is a measurement value measured by the air flow sensor 112.

22.4 [m$^3$] is the volume of 1 [mol] of the air under standard conditions (273.15 [K], 101.32 [kPa]), and 28.84 [g] is the weight of 1 [mol] of the air.

Piabs is an air inlet absolute pressure Piabs [kPa] which is a sum value of the atmospheric air pressure Pa and the cathode inlet pressure (gauge pressure) Pi, which is detected (measured) by the cathode inlet pressure sensor 118 as gauge pressure.

Ti [K] is a measurement value measured by the cathode inlet temperature sensor 120.

Therefore, in step S7, the mass flow rate M [g/min] of the oxygen-containing gas supplied to the cathode flow field 38 of the fuel cell stack 16 is obtained by the air flow sensor 112 (step S6), and substituted into the equation (1).

Further, the atmospheric air pressure Pa at the current position of the fuel cell vehicle 10 in the above equation (2) is calculated from the altitude obtained from the GPS unit 60 and the 0 m atmospheric air pressure obtained from the weather information (obtained in step S6).

The calculated atmospheric air pressure Pa is added to the cathode inlet pressure (gauge pressure) Pi obtained as the measurement value measured by the cathode inlet pressure sensor 118 (step S6), by substituting these values into the equation (2) to calculate the air inlet absolute pressure Piabs. The calculated air inlet absolute pressure Piabs is substituted into the equation (1).

Further, the temperature Ti measured by the cathode inlet temperature sensor 120 provided in the supply channel 114 (obtained in step S6) is substituted into the equation (1). In this manner, it is possible to calculate the volume flow rate F [m³/sec].

The scavenging period St [sec] is determined from the calculated volume flow rate F [m³/sec] with reference to the characteristics of the scavenging period St [sec] relative to the volume flow rate F [m³/sec] (characteristics where the mass flow rate of the horizontal axis of the characteristics 80 in FIG. 3 is converted into the volume flow rate). Further, the determined scavenging period St [sec] may be corrected with reference to the characteristics 82 of the coefficient k relative to the relative humidity Ha [%] (FIG. 4) to determine the scavenging period St×k (the coefficient k increases as the relative humidity Ha increases).

INVENTION UNDERSTOOD FROM THE EMBODIMENT

Next, the invention understood from the above embodiment will be described below. It should be noted that, for ease of understanding, constituent elements are labelled with the reference numerals of those used in the embodiment, but the present invention is not limited to such constituent elements labelled with the reference numerals.

The fuel cell vehicle 10 according to the present invention includes the fuel cell stack 16 including the cathode flow field 38 and the anode flow field 36, the atmospheric air pressure acquisition unit 61 (air pressure sensor may be used) configured to obtain pressure Pa of the atmospheric air, the pump 26 configured to suck the atmospheric air and supply the oxygen-containing gas to the cathode flow field 38 through the supply channel 114, and the scavenging period setting unit 12 configured to, in the case where the temperature is predicted to be below freezing temperature after the time of stopping operation of the fuel cell stack 16, set the scavenging period St for the time of stopping operation based on the atmospheric air pressure Pa, in order to perform scavenging of the cathode flow field 38 by the oxygen-containing gas in a manner that the cathode flow field 38 is placed in a humid state which enables stable start-up operation below the freezing temperature.

In the structure, since the scavenging period St is determined based on the atmospheric air pressure Pa, regardless of whether the place is the highland or the plain land (normal land), it is possible to place the cathode flow field 38 of the fuel cell stack 16 in the optimum humid state.

In this case, the atmospheric air pressure acquisition unit 61 may be configured to obtain the atmospheric air pressure Pa based on the altitude based on position information of the own vehicle 10.

The atmospheric air pressure Pa is related to the altitude, and the altitude can be obtained by the GPS unit 60, etc. based on the position information of the own vehicle 10. Therefore, even if no air pressure sensor is provided in the fuel cell vehicle 10, it is possible to obtain the correct atmospheric air pressure Pa based on the relationship between the altitude and the atmospheric air pressure Pa.

The fuel cell vehicle 10 may further include the mass flow rate sensor 112 configured to detect the mass flow rate M [g/min] of the oxygen-containing gas flowing through the supply channel 114, the cathode inlet pressure sensor 118 configured to detect the pressure Pi [kPa] of the oxygen-containing gas at the inlet of the cathode flow field 38, and the cathode inlet temperature sensor 120 configured to detect temperature Ti [K] of the oxygen-containing gas at the inlet of the cathode flow field 38. The scavenging period setting unit 12 may be configured to determine the volume flow rate F [m³/sec] in the supply channel 114 based on the atmospheric air pressure Pa, the mass flow rate M [g/min], the cathode inlet pressure Pi [kPa], and the cathode inlet temperature Ti [K], and the scavenging period St [sec] may be set based on the determined volume flow rate F [m³/sec].

With this configuration, since the scavenging period St [sec] is set based on the volume flow rate F [m³/sec] in consideration of changes in the cathode inlet temperature Ti and the atmospheric air temperature Pa, it is possible to easily set the optimum scavenging period St [sec].

Figure 5:
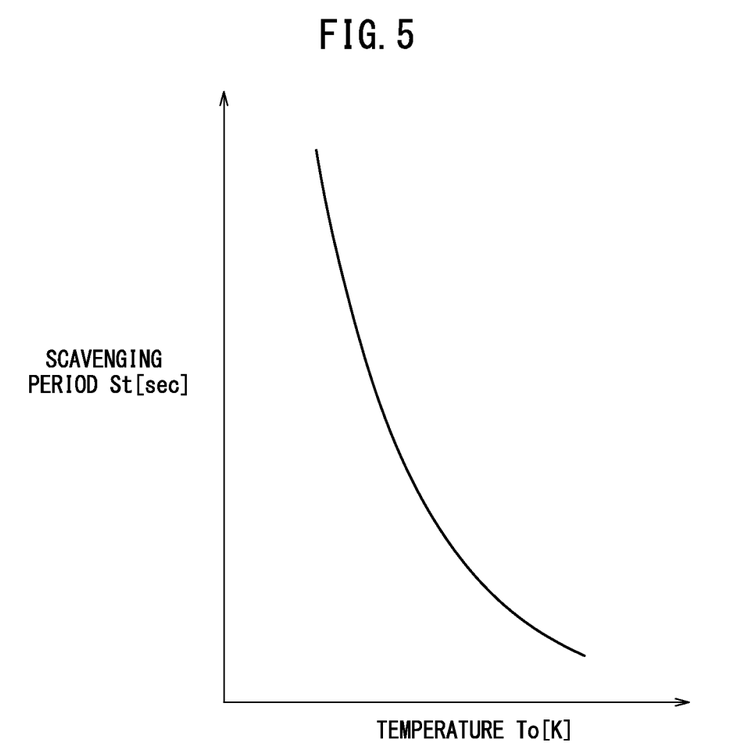
FIG. 5 is graph showing temperature/scavenging period characteristics.

FIG. 5 is graph showing temperature/scavenging period characteristics representing the relationship between the cathode outlet temperature To [K] corresponding to the internal temperature of the fuel cell stack 16 and the scavenging period St [sec]. The scavenging period St [sec] becomes short as the cathode outlet temperature To [K] increases.

Further, the fuel cell vehicle 10 may further include the atmospheric air humidity acquisition unit 61 configured to obtain humidity Ha [%] of the atmospheric air based on position information of the fuel cell vehicle 10, and the scavenging period setting unit 12 may be configured to increase the scavenging period St [sec] in the case where the humidity Ha [%] of the atmospheric air is high, in comparison with the case where the humidity Ha [%] of the atmospheric air is low.

By increasing the scavenging period St in the case where the humidity Ha [%] of the atmospheric air is high, in comparison with the case where the humidity Ha [%] of the atmospheric air is low, the variation range of the alternating current impedance becomes small, and it becomes possible to achieve the more optimum humid state.

Figure 6:
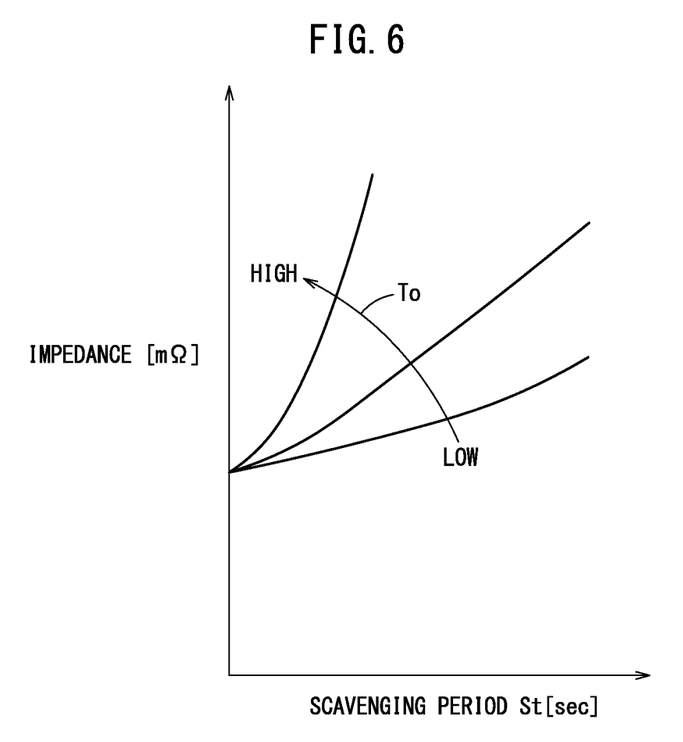
FIG. 6 is a graph showing scavenging period/impedance characteristics using temperature as a parameter.

FIG. 6 is a graph showing an example of characteristics of alternating current impedance [mΩ] relative to the scavenging period St [sec] when the cathode outlet temperature To corresponding to the internal temperature of the fuel cell stack 16 is used as a parameter. As the alternating current impedance [mΩ] increases, the inside of the fuel cell stack 16 becomes more dried. In the characteristics of FIG. 6, as the cathode outlet temperature To increases, the scavenging period St [sec] becomes short, because the dried state is achieved more easily by the scavenging.

Further, a method of stop time scavenging period of a fuel cell vehicle according to the present invention is provided.

The fuel cell vehicle 10 includes the fuel cell stack 16 including the cathode flow field 38 and the anode flow field 36, the atmospheric air pressure acquisition unit 61 configured to obtain pressure Pa of the atmospheric air, and the pump 26 configured to suck the atmospheric air and supply the oxygen-containing gas to the cathode flow field 38 through the supply channel 114. The method includes the step S4 of predicting whether or not the temperature will be below freezing temperature after the time of stopping operation of the fuel cell stack 16, and the step S7 of, in the case where the temperature is predicted to be below the freezing temperature (step S4: YES), setting a scavenging period St for the time of stopping operation in consideration of the atmospheric air pressure Pa, in order to perform scavenging of the cathode flow field 38 by the oxygen-containing gas in a manner that the cathode flow field 38 is placed in a humid state which enables stable start-up operation below the freezing temperature.

In the method of setting stop time scavenging period of the fuel cell vehicle of the present invention, since the scavenging period St is determined based on the atmospheric air pressure Pa, regardless of whether the place is the highland or the plain land (normal land), it is possible to place the cathode flow field 38 of the fuel cell stack 16 in the optimum humid state.

It should be noted that the present invention is not limited to the above embodiment. It is a matter of course that various structures may be adopted based on the disclosure of this specification.

What is claimed is:

1. A fuel cell vehicle comprising:
   a fuel cell stack including a cathode flow field and an anode flow field;
   an atmospheric air pressure acquisition unit configured to obtain pressure of atmospheric air;
   a pump configured to suck the atmospheric air and supply an oxygen-containing gas to the cathode flow field through a supply channel; and
   a scavenging period setting unit configured to, in a case where temperature is predicted to be below freezing temperature after a time of stopping operation of the fuel cell stack, set a scavenging period for the time of stopping operation based on the atmospheric air pressure according to the relationship that the lower the atmospheric air pressure, the shorter the scavenging period, in order to perform scavenging of the cathode flow field by the oxygen-containing gas in a manner that the cathode flow field is placed in a humid state which enables stable start-up operation below the freezing temperature.

2. The fuel cell vehicle according to claim 1, wherein the atmospheric air pressure acquisition unit obtains the atmospheric air pressure based on altitude based on position information of the fuel cell vehicle.

3. The fuel cell vehicle according to claim 1, further comprising:
   a mass flow rate sensor configured to detect a mass flow rate of the oxygen-containing gas flowing through the supply channel;
   a cathode inlet pressure sensor configured to detect pressure of the oxygen-containing gas at an inlet of the cathode flow field; and
   a cathode inlet temperature sensor configured to detect temperature of the oxygen-containing gas at the inlet of the cathode flow field, wherein
   the scavenging period setting unit determines a volume flow rate in the supply channel based on the atmospheric air pressure, the mass flow rate, the cathode inlet pressure, and the cathode inlet temperature, and sets the scavenging period based on the determined volume flow rate.

4. The fuel cell vehicle according to claim 1, further comprising an atmospheric air humidity acquisition unit configured to obtain humidity of the atmospheric air based on position information of the fuel cell vehicle, wherein
   the scavenging period setting unit increases the scavenging period in a case where the humidity of the atmospheric air is high, in comparison with a case where the humidity of the atmospheric air is low.

5. A method of determining a stop time scavenging period of a fuel cell vehicle, the fuel cell vehicle including: a fuel cell stack including a cathode flow field and an anode flow field; an atmospheric air pressure acquisition unit configured to obtain pressure of atmospheric air; and a pump configured to suck the atmospheric air and supply an oxygen-containing gas to the cathode flow field through a supply channel,
   the method comprising the steps of:
   predicting whether or not temperature will be below freezing temperature after a time of stopping operation of the fuel cell stack; and
   in a case where the temperature is predicted to be below the freezing temperature, setting a scavenging period for the time of stopping operation in consideration of the atmospheric air pressure according to the relationship that the lower the atmospheric air pressure, the shorter the scavenging period, in order to perform scavenging of the cathode flow field by the oxygen-containing gas in a manner that the cathode flow field is placed in a humid state which enables stable start-up operation below the freezing temperature.

6. The fuel cell vehicle according to claim 1, further comprising a cathode outlet temperature sensor configured to detect temperature of the oxygen-containing gas at an outlet of the cathode flow field, wherein
   the scavenging period setting unit sets the scavenging period in a manner that the higher the temperature at the outlet of the cathode flow field, the shorter the scavenging period.

* * * * *